UNITED STATES PATENT OFFICE.

HENRY JORDAN, OF SAN FRANCISCO, CALIFORNIA.

CEMENT COMPOUND.

SPECIFICATION forming part of Letters Patent No. 231,172, dated August 17, 1880.

Application filed March 22, 1880. (No specimen.)

*To all whom it may concern:*

Be it known that I, HENRY JORDAN, of the city and county of San Francisco, State of California, have invented or discovered an Improved Cement Compound and Process for Compounding the Same, of which the following is a full, clear and correct descrip ion.

The object of my invention is to produce by the combination of ordinary ingredients, such as can be obtained in any part of the country, a cement that will possess all the qualities and properties of the best hydraulic Portland cement.

In the manufacture of my cement I employ largely the refuse from soda-works, refuse from gas-works, and refuse from tanneries, so that I am able to produce the cement at a small cost compared with the cost of producing it from the original or raw material.

The refuse from soda-works is composed of lime, soda, potash, magnesia, and alum in varying proportions. In order to serve my purpose, however, it must contain a large excess of lime, to supply which I add to it either the refuse from gas-works or the refuse from tanners' vats. The refuse from these latter factories is composed principally of lime, that from gas-works being much the strongest. I therefore choose the one which contains the requisite amount of lime to temper the refuse from soda-works, in order to produce a good cement.

The proportion which each of these substances should bear to each other is stated thus: Lime, 50; soda, .92; potash, 2.89; magnesia, 1.19; alum, .18.

When the refuse from soda-works has been brought to these proportions by tempering with the refuse from gas-works, or with the refuse from tanners' vats, as above described, I combine it with the following ingredients in about the proportions specified, to wit: Silica, 21.54; oxide of iron, 5.48; alumina, 19.

In combining these ingredients I place them all in a tank together, and after adding the proper quantity of water, stir and mix until they are all thoroughly incorporated. I then remove the mixture to a proper furnace and calcine it, and afterward grind it to a powder, in the ordinary way of preparing cements.

The calcining can be accomplished in any suitable furnace; but I shall employ a furnace of peculiar construction, which I have designed, and for which I shall hereafter make application for Letters Patent.

Usually I shall add to the mixture a small quantity of greenstone (diabase) before reducing it; but this is not material.

To give to this cement a color similar to the color of Portland cement, I add a sufficient quantity of what is known as "Mission mud," which is a mud that is found on the bottom of the San Francisco bay; but any other suitable coloring ingredient can be used.

This cement sets readily, and in all particulars resembles Portland cement. It will harden either in the air or under water. It is cheaply produced from material that is otherwise wasted, thus utilizing a waste product and producing a valuable article of commerce.

Having thus described my invention or discovery, what I claim, and desire to secure by Letters Patent, is—

The cement compound composed of silica, oxide of iron, and alumina combined with lime, soda, potash, magnesia, and alum, tempered with refuse from gas-works or tanneries, as set forth.

In witness whereof I have hereunto set my hand and seal.

HENRY JORDAN. [L. S.]

Witnesses:
  WM. F. CLARK,
  EDWARD L. OSBORN.